United States Patent
Rojas-Cessa et al.

(10) Patent No.: US 8,995,456 B2
(45) Date of Patent: Mar. 31, 2015

(54) SPACE-SPACE-MEMORY (SSM) CLOS-NETWORK PACKET SWITCH

(75) Inventors: Roberto Rojas-Cessa, Brooklyn, NY (US); Chuan-bi Lin, Kearny, NJ (US); Ziqian Dong, Kearny, NJ (US)

(73) Assignee: Empire Technology Development LLC, Wilmington, DE (US)

( * ) Notice: Subject to any disclaimer, the term of this patent is extended or adjusted under 35 U.S.C. 154(b) by 918 days.

(21) Appl. No.: 12/420,714

(22) Filed: Apr. 8, 2009

(65) Prior Publication Data

US 2010/0260198 A1  Oct. 14, 2010

(51) Int. Cl.
| | |
|---|---|
| H04L 12/28 | (2006.01) |
| H04L 12/933 | (2013.01) |
| H04L 12/947 | (2013.01) |
| H04L 12/937 | (2013.01) |
| H04L 12/935 | (2013.01) |

(52) U.S. Cl.
CPC .......... *H04L 49/1515* (2013.01); *H04L 49/101* (2013.01); *H04L 49/25* (2013.01); *H04L 49/254* (2013.01); *H04L 49/3045* (2013.01)
USPC .......................................... 370/417; 710/316

(58) Field of Classification Search
CPC ................................................. H04L 49/1569
USPC .......... 370/417, 390, 353, 388, 230; 340/2.22
See application file for complete search history.

(56) References Cited

U.S. PATENT DOCUMENTS

| | | | |
|---|---|---|---|
| 5,166,926 A | 11/1992 | Cisneros et al. | |
| 6,101,190 A | 8/2000 | Song | |
| 6,907,041 B1 | 6/2005 | Turner et al. | |
| 6,940,851 B2 | 9/2005 | Oki et al. | |
| 6,961,342 B1 | 11/2005 | Uzun et al. | |
| 7,006,514 B2 | 2/2006 | Oki et al. | |
| 7,046,661 B2 | 5/2006 | Oki et al. | |
| 7,103,056 B2 | 9/2006 | Chao et al. | |
| 7,173,931 B2* | 2/2007 | Chao et al. | 370/388 |
| 7,342,887 B1 | 3/2008 | Sindhu et al. | |
| 7,535,893 B1* | 5/2009 | Beladakere et al. | 370/353 |
| 7,843,908 B2 | 11/2010 | Rojas-Cessa et al. | |
| 2002/0061028 A1 | 5/2002 | Chao et al. | |
| 2002/0110135 A1 | 8/2002 | Oki et al. | |
| 2002/0147851 A1 | 10/2002 | Morimura et al. | |
| 2003/0021266 A1* | 1/2003 | Oki et al. | 370/388 |
| 2004/0081184 A1 | 4/2004 | Magill et al. | |

(Continued)

FOREIGN PATENT DOCUMENTS

| | | |
|---|---|---|
| CN | 101304374 A | 11/2008 |
| JP | 10-271110 | 10/1998 |

(Continued)

OTHER PUBLICATIONS

Rojas-Cessa et al., CIXOB-k: Combined Input-Crosspoint-Output Buffered Packet Switch, IEEE Proceedings of Globecom 2001, Nov. 2001, pp. 2654-2660, vol. 4, Dallas TX, USA.

(Continued)

*Primary Examiner* — Dang Ton
*Assistant Examiner* — Lionel Preval (57) ABSTRACT

A Clos-network packet switching system may include input modules coupled to a virtual output queue, central modules coupled to the input modules, and output modules coupled to the central modules, each output module having a plurality of cross-point buffers for storing a packet and one or more output ports for outputting the packet.

17 Claims, 6 Drawing Sheets

(56) References Cited

U.S. PATENT DOCUMENTS

| | | | |
|---|---|---|---|
| 2004/0085967 | A1 | 5/2004 | Boduch et al. |
| 2005/0002334 | A1* | 1/2005 | Chao et al. ............... 370/230 |
| 2005/0025141 | A1 | 2/2005 | Chao et al. |
| 2005/0226551 | A1 | 10/2005 | Pichler et al. |
| 2007/0053356 | A1* | 3/2007 | Konda ............... 370/390 |
| 2007/0140232 | A1 | 6/2007 | Carson |
| 2008/0212472 | A1 | 9/2008 | Musacchio et al. |
| 2008/0303628 | A1* | 12/2008 | Rojas-Cessa et al. ....... 340/2.22 |
| 2009/0262744 | A1 | 10/2009 | Fraser |
| 2010/0202460 | A1 | 8/2010 | Park et al. |
| 2010/0238949 | A1 | 9/2010 | Passas et al. |
| 2010/0316061 | A1 | 12/2010 | Rojas-Cessa et al. |
| 2010/0329249 | A1 | 12/2010 | Shenoy et al. |
| 2011/0026532 | A1 | 2/2011 | Rojas-Cessa et al. |
| 2011/0167191 | A1 | 7/2011 | Olesinski et al. |

FOREIGN PATENT DOCUMENTS

| | | |
|---|---|---|
| JP | 2000-196609 | 7/2000 |
| JP | 2001045026 | 2/2001 |
| JP | 2005045626 | 2/2005 |
| WO | 03081944 A1 | 10/2003 |
| WO | 2007078824 A2 | 7/2007 |
| WO | 2008154390 A1 | 12/2008 |

OTHER PUBLICATIONS

C. Clos, A Study of Non-Blocking Switching Networks, The Bell System Technical Journal,, Mar. 1953, pp. 406-424, vol. 32, USA.
Lee et al., Parallel Routing Algorithm in Benes-Clos Networks, in Proc. IEEE Infocom 1996, 1996, pp. 279-286. [Month of publication is unknown. The year of publication is sufficiently earlier than the effective U.S. filing date and any foreign priority date so the particular month of publication is not in issue.] [City/country of publication is unknown.].
Pun et al., Distro: A Distributed Static Round-Robin Scheduling Algorithm for Bufferless Clos-Network Switches, in Proc. IEEE Globecom, 2002, pp. 2298-2302, vol. 3. [Month of publication is unknown. The year of publication is sufficiently earlier than the effective U.S. filing date and any foreign priority date so the particular month of publication is not in issue.] [City/country of publication is unknown.].
Chiussi et al., Low-Cost Scalable Switching Solutions for Broadband Networking: The ATLANTA Architecture and Chipset, IEEE Communications Magazine, Dec. 1997, pp. 44-53. [City/country of publication is unknown.].
Pun et al., Static Round-Robin Dispatching Schemes for Clos-Network Switches, IEEE Workshop on High Performance Switching and Routing, May 2002, pp. 329-333. [City/country of publication is unknown.].
Turner et al., Architectural Choices in Large Scale ATM Switches, IEICE Transactions Communication, Feb. 1998, pp. 1-27, vol. E81-B, No. 2. [City/country of publication is unknown.].
Koutoukov et al., "BANKIR" Satellite Communication System, Satellite Communications, Oct. 1994, pp. 183-189, IEEE Proceedings Conference, Moscow, Russia.
Lin et al., Module-First Matching Schemes for Scalable Input-Queued Space-Space-Space Clos-Network Packet Switches, IEEE International Conference on Communications, May 2008, pp. 5669-5673. [City/country of publication is unknown].
Santosh Krishnan et al., Technical Report on Buffered Clos Switches, Nov. 1, 2002, Department of Computer Science Columbia University. [City/country of publication is unknown.].
Ricardo's Geo-Orbit Quick-Look an easy-to-use reference chart for sat tv viewers and engineers, Global C/Ku Satellite Listings with Footprints, found at www.geo-orbit.org/default.html, obtained on Feb. 2, 2012, [Month and year of publication is unknown.].
Xiangjie Ma et al., Analysis on Memory-Space-Memory Clos Packet Switching Network, Advanced Parallel Processing Technologies, Lecture Notes in Computer Science, Nov. 22, 2007, pp. 209-221. [City/country of publication is unknown.].

European Search Report mailed May 10, 2010 for European Application No. 10154701.6-2416, Filing Date Feb. 25, 2010, Germany.
International Preliminary Report on Patentability, mailed Dec. 16, 2011 for related International Application PCT/US2010/038361, Filing Date Jun. 10, 2010, Switzerland.
PCT International Search Report and Written Opinion of the International Searching Authority, mailed Jul. 30, 2010 for related International Application PCT/US2010/038361, Filing Date Jun. 10, 2010, Australia.
Wang et al., Analysis on the Central-Stage Buffered Clos-Network for Packet Switching, IEEE International Conference on Communications, 2005, pp. 1053-1057, vol. 2. [Month of publication is unknown. The year of publication is sufficiently earlier than the effective U.S. filing date and any foreign priority date so the particular month of publication is not in issue.] [City/country of publication is unknown.].
Chao et al., Matching Algorithms for Three-Stage Bufferless Clos Network Switches, IEEE Communications Magazine, Oct. 2003, pp. 46-54, vol. 41, Issue 10. [City/country of publication is unknown.].
Rojas-Cessa et al., Scalable Two-Stage Clos-Network Switch and Module-First Matching, IEEE Workshop on High Performance Switching and Routing, 2006. [Month of publication is unknown. The year of publication is sufficiently earlier than the effective U.S. filing date and any foreign priority date so the particular month of publication is not in issue.] [City/country of publication is unknown.].
Lin et al., Module Matching Schemes for Input-Queued Clos-Network Packet Switches, IEEE Communications Letters, Feb. 2007, pp. 194-196, vol. 11, Issue 2. [City/country of publication is unknown.].
Oki et al., Concurrent Round-Robin-Based Dispatching Schemes for Clos-Network Switches, IEEE/ACM Transactions on Networking, Dec. 2002, pp. 830-844, vol. 10, No. 6, USA.
Rojas-Cessa et al., CIXB-1: Combined Input-One-Cell-Crosspoint Buffered Switch, IEEE Workshop on High Performance Switching and Routing, May 2001, pp. 324-329. [City/country of publication is unknown.].
Hluchyj et al., Queueing in High-Performance Packet Switching, IEEE Journal on Selected Areas of Communications, Dec. 1988, pp. 1587-1597, vol. 6, Issue 9. [City/country of publication is unknown.].
McKeown et al., Achieving 100% Throughput in an Input-Queued Switch, IEEE Transactions on Communications, Aug. 1999, pp. 1260-1267, vol. 47, No. 8. [City/country of publication is unknown.].
PCT Notification of Transmittal of the International Search Report and the Written Opinion of the International Searching Authority, or the Declaration, mailed Sep. 15, 2010 for related International Application PCT/US2010/038146, Filed on Jun. 10, 2010, Australia.
Scott et al., The Black Widow High-Radix Clos Network, IEEE Proceedings of the 33rd International Symposium on Computer Architecture, 2006, pp. 1-12. [Month of publication is unknown. The year of publication is sufficiently earlier than the effective U.S. filing date and any foreign priority date so the particular month of publication is not in issue.] [City/country of publication is unknown.].
Rojas-Cessa et al., Maximum Weight Matching Dispatching Scheme In Buffered Clos-Network Packet Switches, IEEE International Conference on Communications, 2004, pp. 1075-1079. [Month of publication is unknown. The year of publication is sufficiently earlier than the effective U.S. filing date and any foreign priority date so the particular month of publication is not in issue.] [City/country of publication is unknown.].
Rojas-Cessa et al., NeTs-NR: Networks With Extended Quality of Service Using Service Vectors, National Science Foundation Award No. 0435250, unpublished.
International Search Report mailed Aug. 4, 2010 for related International Application PCT/US2010/038161, Filed on Jun. 10, 2010, Australia.
Lin, C-B., and Rojas-Cessa, R., "Frame Occupancy-Based Dispatching Schemes for Buffered Three-stage Clos-Network Switches," 13th IEEE International Conference on Networks, Jointly held with the 2005 IEEE 7th Malaysia International Conference on Communication, vol. 2, pp. 1-5.
Oki, E., et al., "Concurrent Round-Robin Dispatching Scheme in a Clos-Network Switch," IEEE, pp. 107-111 (2001).

(56) References Cited

OTHER PUBLICATIONS

Rojas-Cessa, R., and Lin, C-B., "Captured-frame matching schemes for scalable input-queued packet switches," Computer Communications, vol. 30, Issue 10, pp. 2149-2161 (2007).

Yang et al., "A new clos fabric with input memory and the study of its routing and scheduling algorithm," in vol. 34, No. 1 of Journal of Xidian University, Feb. 2007, pp. 63-67 (Google translation).

Rojas-Cessa et al., "Load-Balanced Combined Input-Crosspoint Buffered Packet Switch and Long Round-Trip Times," IEEE Communications Letters, vol. 9, No. 7, pp. 661-663, Jul. 2005.

Rojas-Cessa et al., "Combined Input-Crosspoint Buffered Packet Switch with Shared Crosspoint Buffers," 2005 Conference on Information Sciences and Systems, The Johns Hopkins University, May 16-18, 2005, 5 pages.

\* cited by examiner

SPACE-SPACE-MEMORY (SSM) CLOS-NETWORK PACKET SWITCH

STATEMENT REGARDING FEDERALLY SPONSORED RESEARCH OR DEVELOPMENT

This work was supported in part by National Science Foundation grant number 0435250.

BACKGROUND

As the Internet continues to grow, high-capacity switches and routers are needed for backbone networks. Several approaches have been presented for high-speed packet switching systems. Most high-speed packet switching systems use a fixed-sized cell in the switch fabric. Variable-length packets are segmented into several fixed-sized cells when they arrive, switched through the switch fabric, and reassembled into packets before they depart.

For implementation in a high-speed switching system, there are mainly two approaches. One approach is a single-stage switch architecture. An example of the single-stage architecture is a crossbar switch, where identical switching elements are arranged on a matrix plane. However, the number of I/O pins in a crossbar chip may limit the switch size. This makes a large-scale switch difficult to implement cost-effectively, as the number of chips becomes large. Another approach is to use a multiple-stage switch architecture, such as a Clos-network switch. The Clos-network switch architecture, which is a three-stage switch, is scalable. Three-stage Clos-network switches use small switches as modules in each stage to build a switch with a large number of ports and less hardware than that of a single-stage switch of the same size.

BRIEF DESCRIPTION OF THE SEVERAL VIEWS OF THE DRAWING

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods and systems related to Clos-network switch systems and methods for efficiently implementing high-density network switches. An example embodiment generally relates to a switch architecture and a method for configuring the switch that are based on a Clos-network architecture, which implements multiple small switches to build a large-scale switch.

Currently, there are three broad types of Clos-network switches: Space-Space-Space (SSS or buffer-less) architecture, Memory-Space-Memory (MSM) architecture, and Memory-Memory-Memory (MMM) architecture. A SSS Clos-network switch has no memory in any of the three stages. Although the design of the switch modules is rather simple, the SSS Clos-network switch may require a complex matching process and a long resolution time. A variety of matching schemes for SSS Clos-network switches have been proposed. A MSM Clos-network switch uses buffers in the first-stage and third-stage modules to simplify the configuration complexity of Clos-network switches. In this way, the scheduling of packets becomes a dispatching issue. However, the buffers in the first-stage and third-stage modules need to work with speedup (or the implementation of one or more parallel algorithms). This makes the implementation infeasible. A MMM Clos-network switch has buffers in all three stages. This may help to resolve contention from different first-stage modules. However, switches with buffers in the second-stage modules may suffer from serving packets out-of-sequence, which is undesirable, as re-sequencing packets increases the switch's complexity and cost. These switches and schemes, although they are very efficient with benign admissible traffic, require long communication delays among arbiters, or require speedup. The port rates and switch implementation are limited to those delays and speedup. Switch and router builders have not provided an efficient way to implement high-density switches. Further, current switches have a limited port capacity.

Figure 1:
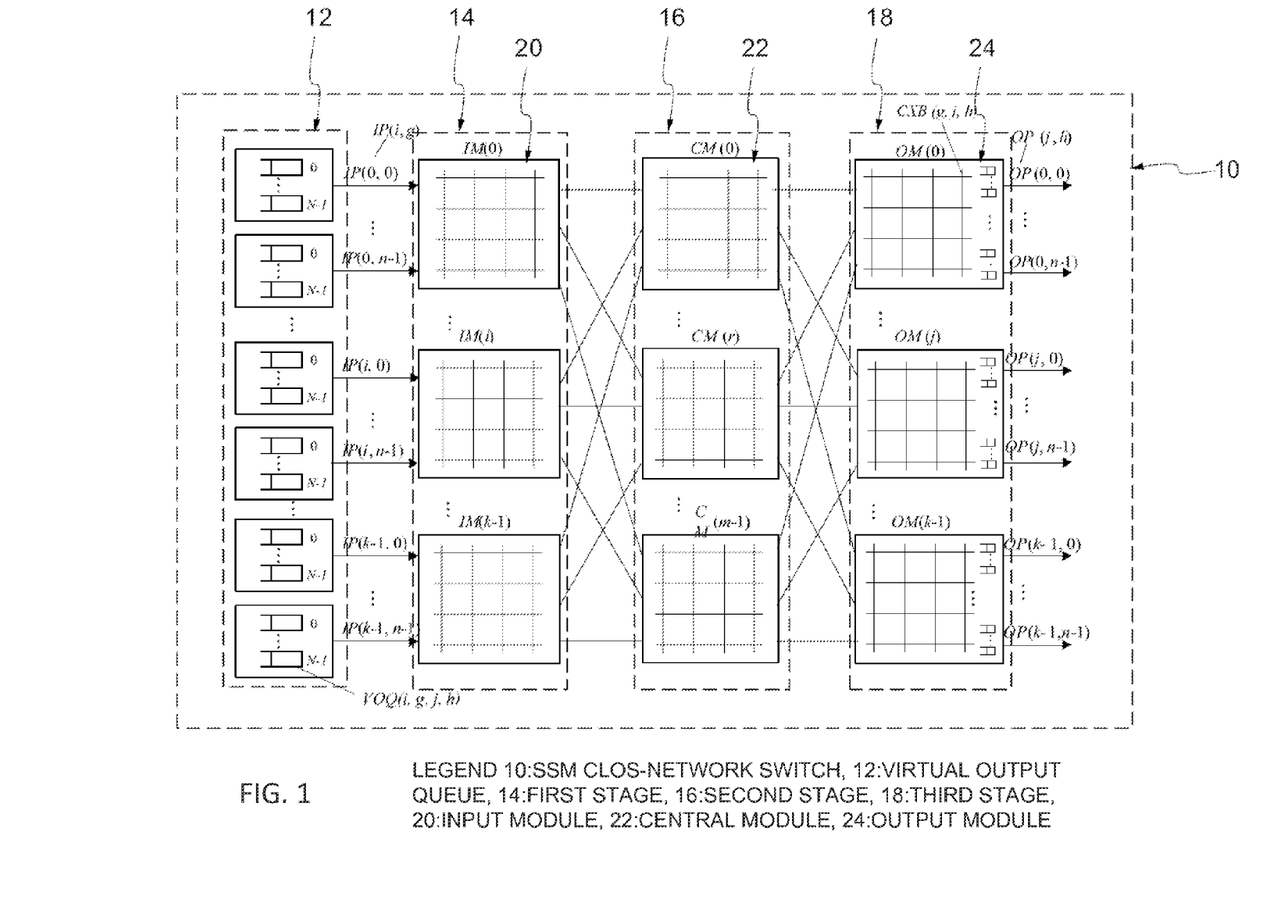
FIG. 1 is a schematic diagram of an example SSM Clos-network switch.

FIG. 1 is a schematic diagram of an example Space-Space-Memory [SSM] Clos-network switch 10 that is arranged in accordance with at least some embodiments of the present disclosure. The example SSM Clos-network switch 10 includes a three-stage switch architecture with cross-point buffers in the third-stage modules and virtual output queues (VOQs) 12 at the input ports. VOQs are input queuing mechanisms in which each input port maintains a separate queue for each output port. The first-stage 14 may include input modules (IMs) such as IM(0) 20, the second-stage 16 may include central modules (CMs) such as CM(0) 22, and the third-stage 18 may include output modules (OMs) such as OM(0) 24.

The example three-stage SSM Clos-network switch 10 utilizes buffers in the crossbars at the third-stage modules. The memory implemented in the buffered crossbar in the third-stage module does not need speedup and may simplify the switch configuration process. The configuration method may be used to provide connectivity between input and output ports of SSM Clos-network switches by performing matching at the module level in a simple and efficient way and by avoiding the matching of ports. The decision of which output ports are connected to the input port may be achieved by allowing the output ports to select a packet from the cross-point buffers at the third-stage modules so that matching may not be needed. The implementation of a scheduler capable of matching thousands of ports in large-size switches may have prohibitively large complexity. To decrease the scheduler complexity, the module-to-module method hierarchizes the matching process and may make the implementation of large switches feasible by requiring arbiters of relatively small size.

Figure 2:
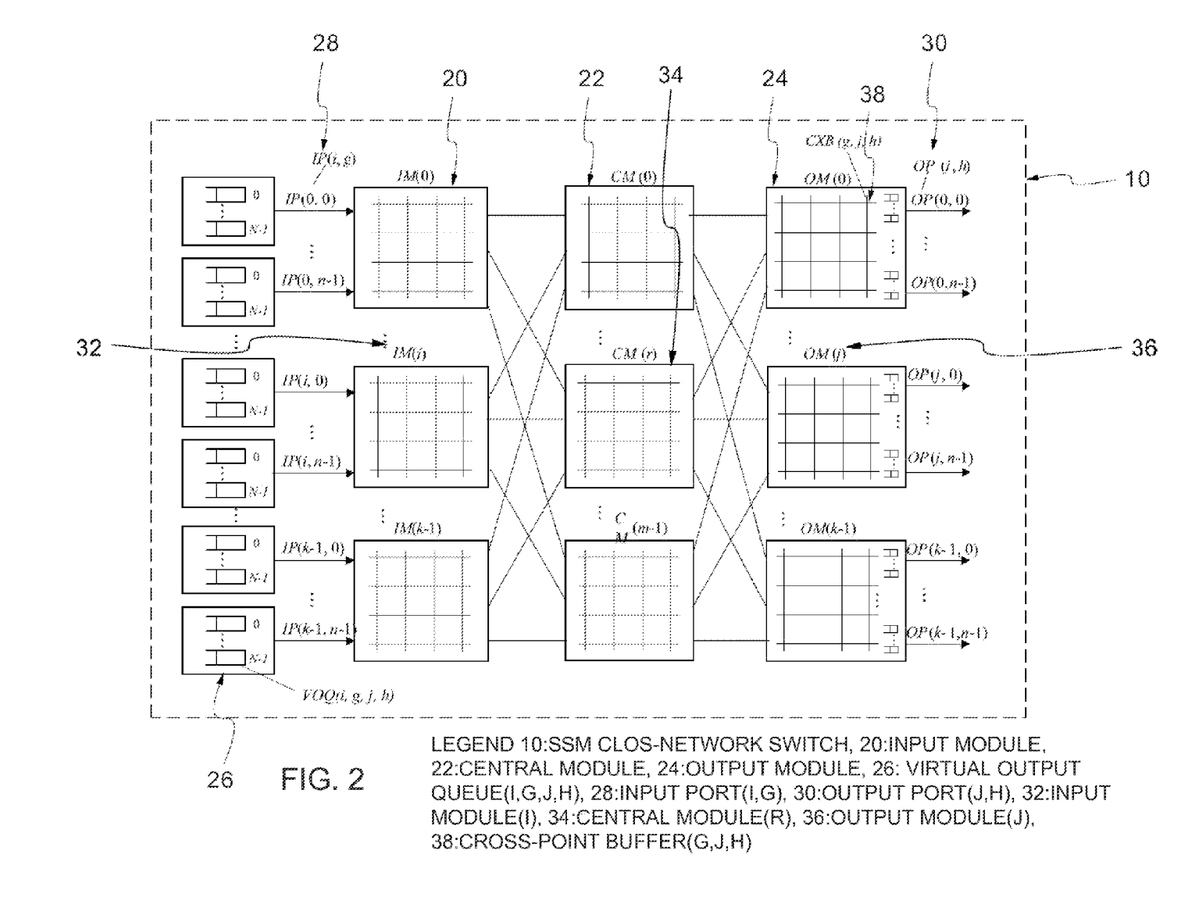
FIG. 2 is another schematic diagram of the example SSM Clos-network switch shown in FIG. 1.

FIG. 2 is another schematic diagram of the example SSM Clos-network switch shown in FIG. 1, arranged in accordance with at least some embodiments of the present disclosure. As shown in FIG. 2, the number of IMs/OMs 20/24 is signified by k, while the number of CMs 22 is signified by m. The number of input ports (IPs) 28 and output ports (OPs) 30 in each IM/OM 20/24 is signified by n. i signifies the IM 20 number, where $0 \leq i \leq k-1$. j signifies the OM 24 number, where $0 \leq j \leq k-1$. r signifies CM 22 number, where $0 \leq r \leq m-1$. h signifies IP/OP 28/30 number in each IM/OM 20/24, respectively, where $0 \leq h \leq n-1$. The IM(i) module 32 signifies the (i+1)th input module, where $0 \leq i \leq k-1$. The CM(r) module 34 signifies the (r+1)th central module, where $0 \leq r \leq m-1$. The OM(j) module 36 signifies the (j+1)th output module, where $0 \leq j \leq k-1$. The IP(i,g) input port 28 signifies the (g+1)th input port at IM(i) 32, where $0 \leq g \leq n-1$. The OP(j,h) output port 30 signifies the (h+1)th output port at OM(j) 36, where $0 \leq h \leq n-1$. VOQ(i,g,j,h) 26 signifies the virtual output queue at IP(i,g) 28 that is destined for OP(j,h). The cross-point buffer at OM(j) 36 that stores cells from CM(r) 34 to OP(j,h) is signified by CXB(r,j,h) 38.

In the illustrated example, each IP(i,g) 28 has N=n×k VOQs 26 to avoid head-of-line (HOL) blocking, a phenomenon that may severely degrade switch performance by limiting a switch's 10 throughput. N signifies the total number of ports of the Clos-network switch. Each OM(j) 34 has N=n×k cross-point buffers 38 to store cells going from VOQ(i,g,j,h) 26 to OP(j,h). Further, $L_I(i; r)$ signifies an output link at IM(i) 32 that may be coupled to CM(r) 34. $L_C(r; j)$ signifies an output link at CM(r) 34 that is coupled to OM(j) 36.

Figure 3:
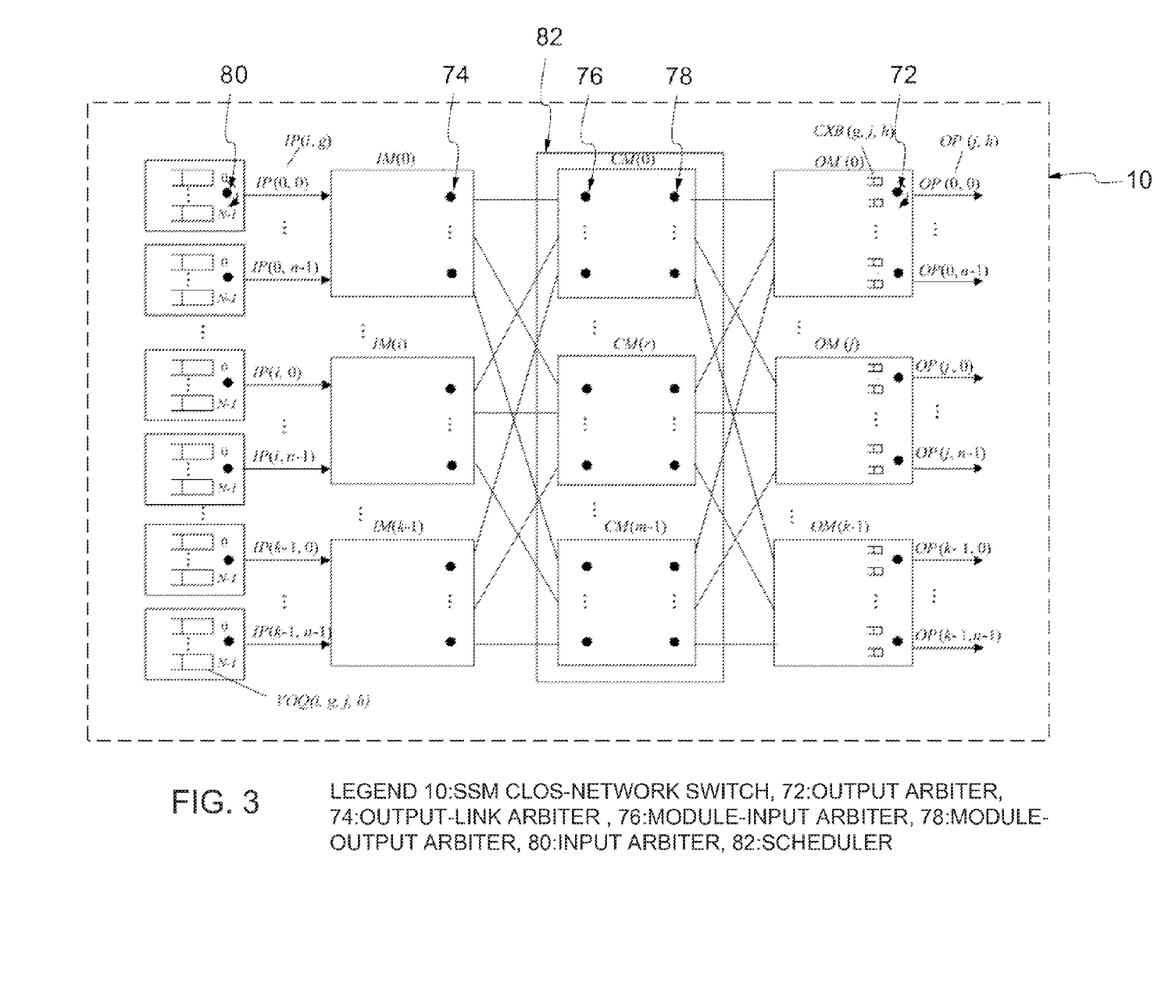
FIG. 3 is another schematic diagram of the example SSM Clos-network switch shown in FIG. 1.

FIG. 3 is another schematic diagram of the example SSM Clos-network switch shown in FIG. 1, arranged in accordance with at least some embodiments of the present disclosure. As shown in FIG. 3, the SSM Clos-network switch 10 may include a scheduler 82, $S_M$, configured to perform module matching, which matches the IM(i) 32-OM(j) 36 pairs. There may also be input arbiters 80 and output arbiters 72 at the inputs and OM(j) 36, respectively, configured to arbitrate the packets at the VOQs 26 and cross-point buffers 38 for dispatching.

In some embodiments, cells traverse the SSM Clos-network switch 10 as follows with reference to FIGS. 1-3. First, cells arrive in the VOQs 26 at the inputs and the module scheduler 82 is notified. This scheduler 82 may match IMs 20 to OMs 24. Input arbiters 80 of the matched IMs may select a packet from the VOQ 26 with the longest occupancy (typically, the packet that has been in the queue the longest amount of time) to forward a cell to the destined OM 24. The selected cells may be sent to and stored at their corresponding cross-point buffers 38 at OMs 24. Output arbiters 72 may then select a packet from the cross-point buffer 38 with the longest occupancy (again, typically, the packet that has been in the queue the longest amount of time) to be forwarded to the OP 30. Packets selected by the output arbiters 72 may then be forwarded to the OPs 30.

The use of buffers 38 in the SSM Clos-network switch 10 may make port matching needless, and thereby may reduce the configuration time. Although some embodiments of the SSM Clos-network switch 10 may use cross-point buffers 38 in the third-stage modules 18, the third-stage modules 18 are not required to work with a memory speedup.

Matching schemes used to configure SSM Clos-network switches 10 may adopt two phases: port matching first and routing assignment thereafter. However, executing these two phases may be complex, as output contention and path routing may need to be resolved for every time slot before the cell transmission occurs. The configuration process in some described embodiments of the SSM Clos-network switch 10 may consist of route assignment only, as port matching may not be needed. Port matching may not be needed because several input ports may send cells to a single output in a given time slot, and the buffers at the output port may store all those cells while dispatching one cell out of the port.

Additional embodiments may include a configuration matching scheme for the SSM Clos-network switch 10. This matching scheme may include a weighted module-first and none-port matching scheme (WMF-NP) for the SSM Clos-network switch 10. In some embodiments, the WMF-NP matching scheme may perform module-to-module matching first, and then may match an input to the output-links 74 of input modules 20, which may be executed at the same time the output port arbitration is executed. Input and output arbitrations may be performed separately instead of matching input 28 and output 30 ports. Output arbiters 72 at the output ports 30 in the third-stage modules 18 may select a packet from the cross-point buffers 38 in an independent manner. This may be an improvement over previously proposed weight-based module-first matching schemes for SSS Clos-network switches. The WFM-NP scheme may reduce the scheduler 82 and arbiter sizes and response time of SSM Clos-network switches 10. Furthermore, the memory implemented in the buffered crossbar 38 in the third-stage module 18 may not require speedup to achieve high switching performance.

The present disclosure considers that the WMF-NP scheme may use queue occupancy as the selection policy or weight, for example. In some embodiments, the WMF-NP matching scheme, VOQs 26 and IM output-link arbiters 74, and the input 80 and output arbiters 72 may all use the longest queue-occupancy first as the selection policy. For example, the WMF-NP matching scheme may consider the occupancy of all input ports 28 in an IM 20 for module matching. Further, the VOQs 26 and output-link arbiters 74 may determine what CM 22 cells will use based on the occupancy of CMs 22. Even further, the input arbiter 80 may first select a cell from the queue with the longest occupancy among non-empty VOQs 26 in order to forward the cell to the cross-point buffers 38, and the output arbiters 72 at the third-stage module 18 may select the cross-point buffer 38 with the longest occupancy to forward a cell to the OP 30. As in FIG. 2, a flow control mechanism may be used to indicate to VOQ(i,g,j,h) 26 which CXB(r,j,h) 38 may be available, so that VOQ(i,g,j,h) 26 may forward a cell.

In some embodiments, to determine the weight for the IM(i) 32-OM(j) 36 matching, a switch 10 may implement a VOQ module counter, or VMC(i,j), to count the number of cells in IM(i) 32 that are destined to OM(j) 36. The switch 10 may perform i iterations of matching between VOQs 26 and IM output-link arbiters 74, and $I_M$ iterations for module matching. Each $L_I(i,r)$ may have an available/matched flag $FL_I(i,r)$ and each $L_C(r,j)$ may have an available/matched flag $FL_C(r,j)$. These flags may indicate whether or not a link (and, therefore, the configuration of CM(r)) 34 is selected. These flags may be used to define eligibility of an OM 24 in the module-matching phase. OM(j) 36 may be considered eligible to match IM(i) 32 if there is at least one path (and $L_I(i,r_1)$ and $L_C$ $(r_2,j)$, where $r_1=r_2$) available connecting these two modules.

In some example embodiments, the WMF-NP matching scheme may be implemented as follows. In the first iteration of the WFM-NP matching scheme, module matching may occur. The module matching process follows a request-select-accept approach and includes the following operations:

Operation 1 (Request):
Each VMC with a count larger than zero may transmit a request to the destined and eligible OM arbiter 72 at the $S_M$. The transmitted requests may include the number of cells for an OM 24.

Operation 2 (Select):
If an unmatched OM arbiter at the $S_M$ receives requests, the unmatched OM arbiter may select the request from the VOQ 26 with the largest occupancy.

Operation 3 (Accept):
If an unmatched IM arbiter at the $S_M$ receives one or more selections, the IM arbiter may accept the request from the VOQ 26 with the largest occupancy. The $FL_I$ and $FL_C$ flags of the matched links may be set as matched.

The present disclosure considers that, in the first iteration of the WFM-NP matching scheme (but after the module matching process), the VOQ 26 selection process and the matching process within the IM 20 occurs. In some embodiments, these processes may occur simultaneously. In some other embodiments, the IM 20 matching process must occur after the VOQ 26 selection process.

In the VOQ 26 selection process, each input arbiter ($I_A$) 80 may select one non-empty VOQ 26 for the matched OM(j) 36 by using a "longest queue first," or LQF, selection policy. Other selection policies may also be implemented. For example, a "largest queue first" selection policy may be implemented.

In the IM 20 matching process, each $L_i$ may be matched to an input and includes the following operations:

Operation 1 (Request):
Each input with cells to OM(j) 36 sends a request to all k $L_i(i,r)$ arbiters.

Operation 2 (Select):
Each $L_i$ arbiter then selects the request of an input whose weight is the largest and sends a grant to the input.

Operation 3 (Accept):
Each input accepts one grant.

The IM 20 matching may perform m iterations among those unmatched $L_i$ and inputs. In the $I_M$th iteration of the WFM-NP matching scheme, module matching may again be performed. Note that $I_M$ may have a value of up to k=N/n iterations. In each of these iterations, modules that meet the following criteria are matched:

Criteria 1: Modules with one or more unselected, non-empty input ports 28; and
Criteria 2: $r_1$ of IM output link $L_i(i, r_1)$ is equal to $r_2$ of CM output link $L_C$ $(r_2, j)$, where $r_1$ and $r_2$ are the index of CM(r) 34.

These same modules may also be considered for VOQ 26 selection after each module matching iteration.

After the module matching and selection processes are executed for all iterations, output arbiters 72 at each output port in the OMs 24 may use the LQF policy to select a buffered cell among non-empty cross-point buffers 38 in order to forward a cell to the output port 30.

In some embodiments, the scheduler 82 may include module-input arbiters 76 and module-output arbiters 78. The module-input arbiters 76 and module-output arbiters 78 may assist in matching the input arbiters 80 and output arbiters 72 to facilitate efficient transmission. The scheduler 82 may communicate with input arbiters 80 and output arbiters 72 to inform them of existing packets for switching and to inform queues of which packets have been granted for switching, among other things. In the example of FIG. 3, the scheduler 82 (and corresponding module-input arbiters 76 and module-output arbiters 78) may be distributed throughout the CMs 22. In another example, the scheduler (and corresponding module-input arbiters 76 and module-output arbiters 78) may be a component separate from, but in communication with the modules (IMs 20, CMs 22, and OMs 24).

Figure 4:
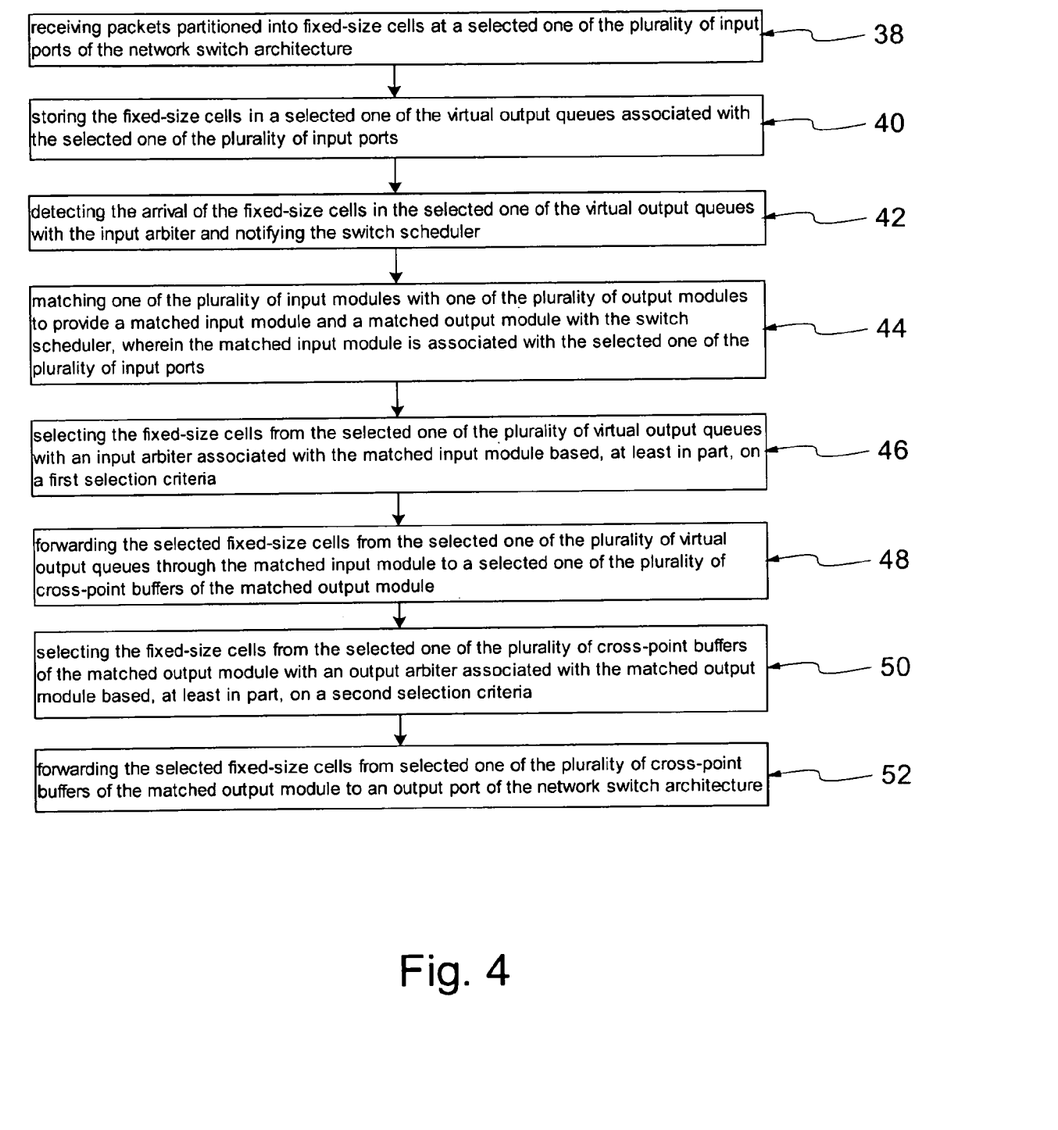
FIG. 4 is a flowchart showing the operation of another example SSM Clos-network switch.

FIG. 4 is a flowchart showing the operation of another example SSM Clos-network switch that is arranged in accordance with at least some embodiments of the present disclosure. The example embodiments may include one or more of processing operations 38, 40, 42, 44, 46, 48, 50 and 52.

Processing begins at operation 38, which may include receiving packets partitioned into fixed-size cells at a selected one of the plurality of input ports of the network switch architecture.

Processing flows from operation 38 to operation 40. Operation 40 may include storing the fixed-size cells in a selected one of the virtual output queues associated with the selected one of the plurality of input ports Continuing from operation 40 to operation 42, operation 42 may include detecting the arrival of the fixed-size cells in the selected one of the virtual output queues with the input arbiter and notifying the switch scheduler.

Proceeding to operation 44, operation 44 may include matching one of the plurality of input modules with one of the plurality of output modules to provide a matched input module and a matched output module with the switch scheduler, wherein the matched input module is associated with the selected one of the plurality of input ports.

Continuing to operation 46 from operation 44, operation 46 may include selecting the fixed-size cells from the selected one of the plurality of virtual output queues with an input arbiter associated with the matched input module based, at least in part, on a first selection criteria.

Continuing to operation 48, operation 48 may forwarding the selected fixed-size cells from the selected one of the plurality of virtual output queues through the matched input module to a selected one of the plurality of cross-point buffers of the matched output module.

Continuing to operation 50 from operation 48, operation 50 may include selecting the fixed-size cells from the selected one of the plurality of cross-point buffers of the matched output module with an output arbiter associated with the matched output module based, at least in part, on a second selection criteria.

Proceeding to operation 52, operation 52 may include forwarding the selected fixed-size cells from selected one of the plurality of cross-point buffers of the matched output module to an output port of the network switch architecture.

Figure 5:
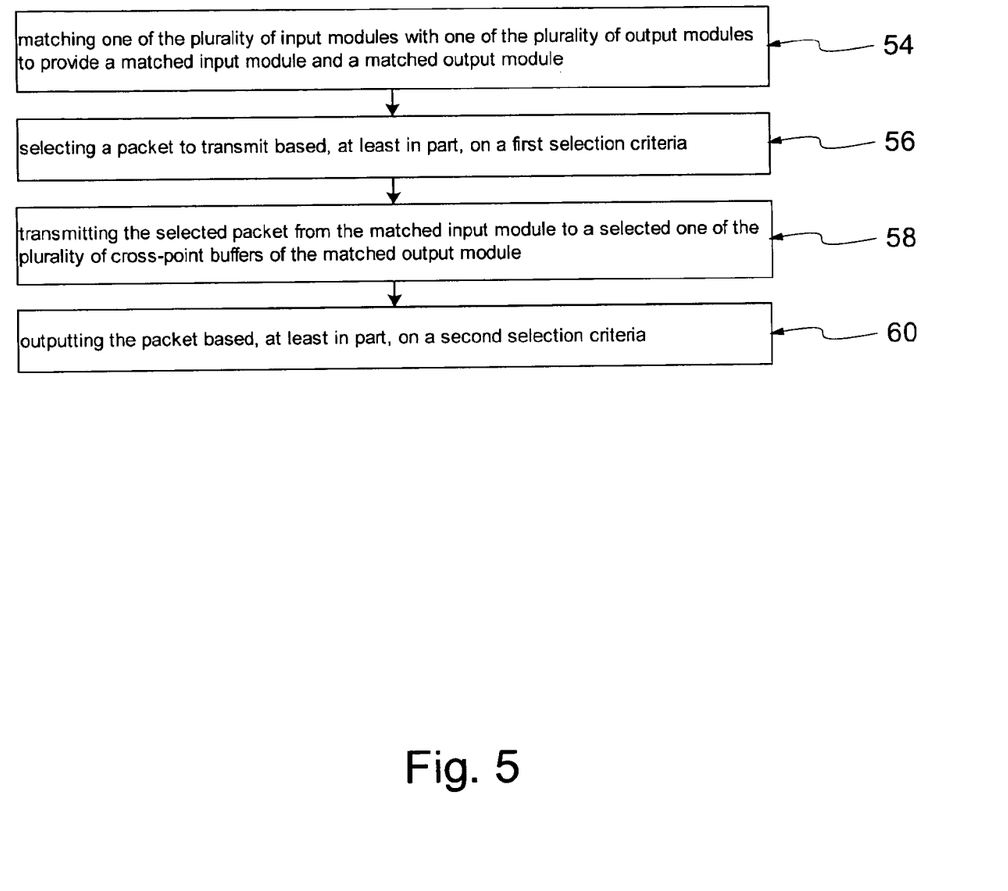
FIG. 5 is a flowchart showing the operation of yet another example SSM Clos-network switch.

FIG. 5 is a flowchart showing the operation of yet another example SSM Clos-network switch arranged in accordance with at least some embodiments of the present disclosure. Example embodiments may include one or more of processing operations 54, 56, 68 and 60.

Processing begins at operation 54. Operation 54 may include matching one of the plurality of input modules with one of the plurality of output modules to provide a matched input module and a matched output module.

Continuing from operation 54 to operation 56, operation 56 may include selecting a packet to transmit based, at least in part, on a first selection criteria.

Processing may continue at operation 58, which may include transmitting the selected packet from the matched input module to a selected one of the plurality of cross-point buffers of the matched output module Proceeding to operation 60, operation 60 may include outputting the packet based, at least in part, on a second selection criteria.

In an example embodiment, a Clos-network architecture 10 may be configured to implement the method of FIG. 5.

Figure 6:
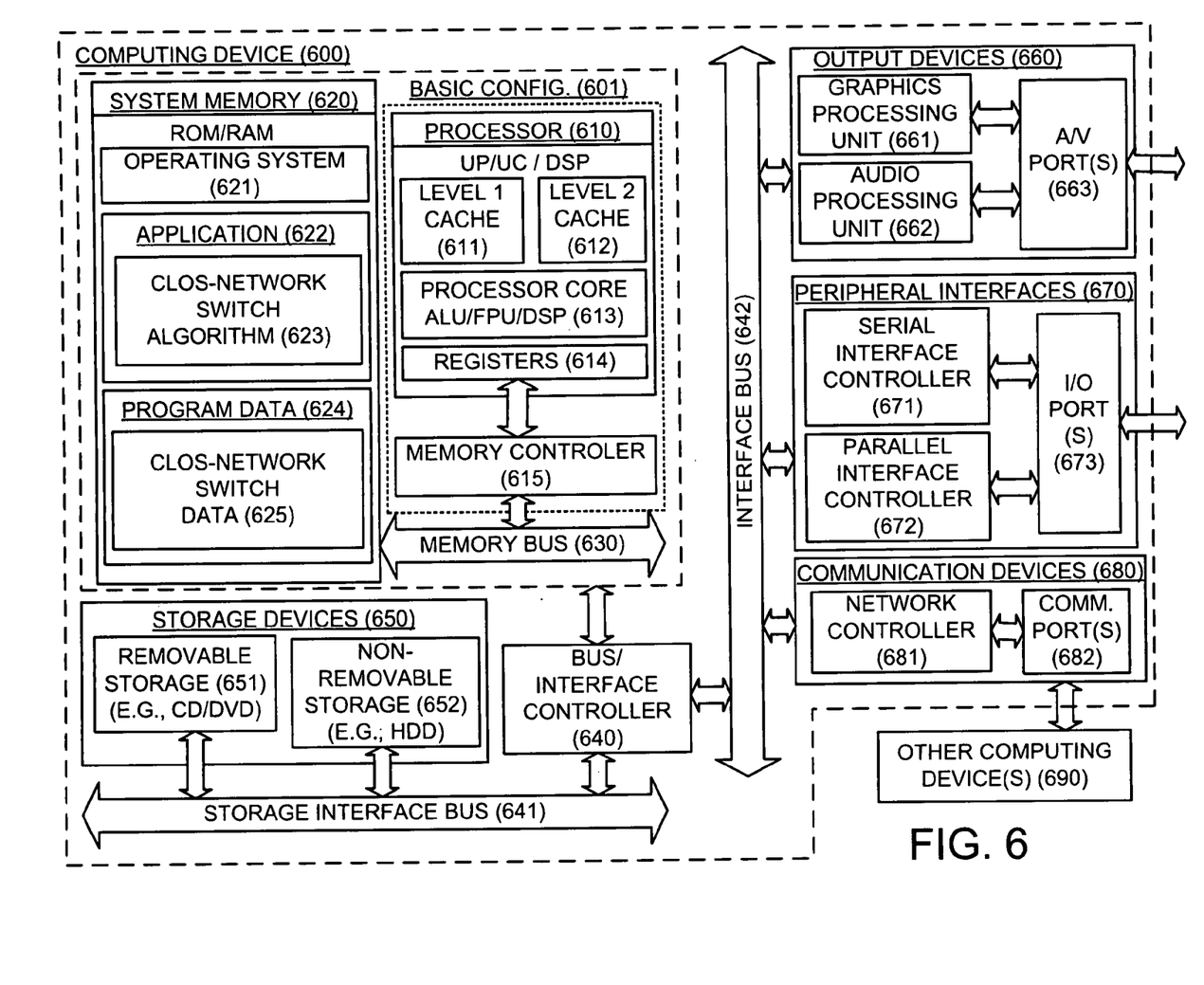
FIG. 6 is a block diagram illustrating an example computing device that is arranged for Clos-network switch implementations, all arranged in accordance with at least some embodiments of the present disclosure.

With reference to FIG. 6, depicted is a block diagram illustrating an example computing device 600 that is arranged for Clos-network switch implementations arranged in accordance with at least some embodiments of the present disclosure. In a very basic configuration 601, computing device 600 typically includes one or more processors 610 and system memory 620. A memory bus 630 may be used for communicating between the processor 610 and the system memory 620.

Depending on the desired configuration, processor 610 may be of any type including but not limited to a microprocessor (μP), a microcontroller (μC), a digital signal processor (DSP), or any combination thereof. Processor 610 may include one more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a Clos-network switch system algorithm 623 that is implemented to efficiently manage network resources. Program Data 624 may include Clos-network switch system data 625. In some embodiments, application 622 may be arranged to operate with program data 624 on an operating system 621 to effectuate the efficient management of network resources. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 6862, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication via one or more communication ports 682. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

According to one embodiment, computing device 600 is connected in a networking environment such that the processor 610, application 622 and/or program data 624 may perform with or as a Clos-network switch system in accordance with embodiments herein.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also

What is claimed is:

1. A Clos-network packet switching system, comprising:
 a plurality of virtual output queues;
 a plurality of input modules, each of the plurality of input modules including a plurality of input ports, each of the plurality of input ports being coupled to a corresponding one of the plurality of virtual output queues;
 a plurality of central modules, each of the plurality of central modules being coupled to each of the plurality of input modules;
 a plurality of output modules, each of the plurality of output modules being coupled to each of the plurality of central modules, the plurality of output modules each including a plurality of cross-point buffers to store a packet and a plurality of output ports to output the packet, each cross-point buffer being associated with an output port; and
 a switch scheduler to perform module-to-module matching, input arbitration, and output arbitration, wherein:
  module-to-module matching occurs before input arbitration and output arbitration,
  module-to-module matching includes a match of one of the plurality of input modules with one of the plurality of output modules via a selected one of the plurality of central modules,
  input arbitration includes selection of a first packet from a first virtual output queue associated with the one of the plurality of input modules, the first packet having a longest occupancy in the first virtual output queue associated with the one of the plurality of input modules and being destined for the one of the plurality of output modules, the selected first packet to be forwarded to the one of the plurality of output modules, and
  output arbitration includes selection of a second packet from a first cross-point buffer associated with the one of the plurality of output modules, the selected second packet to be forwarded to the output port, of the one of the plurality of output modules, associated with the first cross-point buffer.

2. The system of claim 1, further comprising:
 a plurality of input arbiters, each of the plurality of input arbiters being coupled to a corresponding one of the plurality of input modules and configured to communicate with a corresponding one of the plurality of virtual output queues to transmit at least a portion of the packet from the corresponding one of the plurality of input modules to the corresponding cross-point buffer of a matched output module via the selected one of the plurality of central modules; and
 a plurality of output arbiters, each of the plurality of output arbiters being coupled to a corresponding one of the plurality of output modules and configured to communicate with a corresponding one of the plurality of cross-point buffers to output at least a portion of the packet from the corresponding one of the plurality of cross-point buffers of the matched output module to an output port associated with the corresponding one of the plurality of cross-point buffers.

3. The system of claim 1, further comprising:
a plurality of input arbiters, each of the plurality of input arbiters being coupled to a corresponding one of the plurality of input modules and configured to communicate with a corresponding one of the plurality of virtual output queues to facilitate packet transmission from the corresponding one of the plurality of virtual output queues to a cross-point buffer of a corresponding one of the plurality of output modules; and
a plurality of output arbiters, each of the plurality of output arbiters being coupled to the corresponding one of the plurality of output modules and configured to communicate with a corresponding one of the plurality of cross-point buffers to facilitate packet transmission from the corresponding one of the plurality of the cross-point buffers of the matched output module to an corresponding output port associated with the corresponding one of the plurality of cross-point buffers.

4. The system of claim 2, wherein at least one of the plurality of input arbiters is configured to transmit at least the portion of the packet from the corresponding one of the plurality of input modules to the corresponding cross-point buffer of the matched output module via the selected one of the plurality of central modules based, at least in part, on an amount of time that the packet has been located in the corresponding one of the plurality of virtual output queues.

5. The system of claim 2, wherein at least one of the plurality of output arbiters is configured to output at least the portion of the packet from the corresponding one of the plurality of cross-point buffers of the matched output module to the output port associated with the corresponding one of the plurality of cross-point buffers based, at least in part, on an amount of time that the packet has been located in the corresponding one of the plurality of cross-point buffers.

6. The system of claim 2, wherein the packet is separated into a plurality of packet cells to be transmitted from a selected one of the plurality of input ports to a selected one of the plurality of output ports; and wherein each of the packet cells are transmitted from the selected one of the plurality of input ports to the selected one of the plurality output ports via a same one of the plurality of central modules.

7. A Clos-network packet switching system, comprising:
a plurality of virtual output queues configured to queue a packet to be transmitted;
a plurality of input modules, each of the plurality of input modules including a plurality of input ports and a plurality of input module (IM) output links, each of the plurality of input ports being linked to one of the plurality of virtual output queues;
a plurality of central modules linked to each of the plurality of input modules via one of the IM output links, each of the plurality of central modules including a plurality of central module (CM) output links;
a plurality of output modules linked to each of the plurality of central modules via one of the plurality of CM output links, each of the plurality of output modules including a plurality of cross-point buffers configured to store at least a portion of the packet and a plurality of output ports to output the at least the portion of the packet, each cross-point buffer being associated with an output port; and
a scheduler to perform module-to-module matching, input arbitration, and output arbitration, wherein:
module-to-module matching occurs before input arbitration and output arbitration,
module-to-module matching includes matching one of the plurality of input modules with one of the plurality of output modules,
module-to-module matching is performed at least in part by a plurality of module-input arbiters and a plurality of module-output arbiters, each of the plurality of module-input arbiters being linked to one of the plurality of central modules and configured to determine a transmission path of the at least the portion of the packet from one of the plurality of input modules to the plurality of cross-point buffers of a matched output module,
input arbitration includes selection of a first packet from a first virtual output queue associated with the one of the plurality of input modules, the first packet having a longest occupancy in the virtual output queue associated with the one of the plurality of input modules and being destined for the one of the plurality of output modules, the selected first packet to be forwarded to the one of the plurality of output modules,
input arbitration is performed at least in part by a plurality of input arbiters, each of the plurality of input arbiters being linked to the one of the plurality of virtual output queues and also linked to the one of the plurality of input modules, wherein each of the plurality of input arbiters is configured to arbitrate transmission of the at least the portion of the packet from the one of the plurality of input modules to at least one cross-point buffer of at least one output module,
output arbitration includes selection of a second packet from a first cross-point buffer associated with the one of the plurality of output modules, the selected second packet to be forwarded to the output port, of the one of the plurality of output modules, associated with the first cross-point buffer, and
output arbitration is performed at least in part by a plurality of output arbiters, each of the plurality of output arbiters being coupled to the one of the plurality of output modules and configured to communicate with the plurality of cross-point buffers of the matched output module to output the at least the portion of the packet from a cross-point buffer of the matched output module to one of the plurality of output ports associated with the cross-point buffer of the matched output module.

8. A method to facilitate packet transmission using a network switch architecture, wherein the network switch architecture includes a plurality of virtual output queues, a plurality of input modules that include a plurality of input arbiters, a plurality of central modules that include a plurality of module-input arbiters and a plurality of module-output arbiters, a plurality of output modules that include a plurality of cross-point buffers and a plurality of output ports wherein each cross-point buffer is associated with an output port and a plurality of output arbiters, and a switch scheduler to perform module-to-module matching, input arbitration, and output arbitration, the method comprising:
receiving packets partitioned into fixed-size cells at a selected one of a plurality of input ports of the network switch architecture;
storing the fixed-size cells in a selected one of the virtual output queues associated with the selected one of the plurality of input ports;
detecting an arrival of the fixed-size cells in the selected one of the virtual output queues with an input arbiter and notifying the switch scheduler of the arrival;

performing module-to-module matching with the switch scheduler, including matching one of the plurality of input modules with one of the plurality of output modules to provide a matched input module and a matched output module, wherein the matched input module is associated with the selected one of the plurality of input ports;

performing input arbitration with an input arbiter associated with the matched input module, including selecting the fixed-size cells from the selected one of the plurality of virtual output queues based, at least in part, on the selected one of the plurality of virtual output queues having therein fixed-size cells with a longest occupancy amongst the virtual output queues associated with the matched input module;

forwarding the selected fixed-size cells from the selected one of the plurality of virtual output queues through the matched input module to a selected one of the plurality of cross-point buffers of the matched output module;

performing output arbitration with an output arbiter associated with the matched output module, including selecting the fixed-size cells from the selected one of the plurality of cross-point buffers of the matched output module based, at least in part, on a selection criteria; and forwarding the selected fixed-size cells from selected one of the plurality of cross-point buffers of the matched output module to an output port of the network switch architecture.

9. The method of claim 8, wherein the selection criteria is based, at least in part, on a quantity of fixed-size cells in the selected one of the plurality of cross-point buffers.

10. The method of claim 8, wherein the selection criteria is based, at least in part, on a length of time that the fixed-size cells have been stored in the selected one of the plurality of cross-point buffers.

11. A switching system to facilitate packet transmission, comprising:
a plurality of virtual output queues;
a three-stage switch configured as a Clos-network configuration, the three- stage switch including:
a first stage including a plurality of input modules, the first stage being comprised of a plurality of first-stage buffer-less switches;
a second stage including a plurality of central modules, the second stage being comprised of a plurality of second-stage buffer-less switches; and
a third stage including a plurality of output modules, the third stage being comprised of a plurality of third-stage switches that include cross-point buffers, each cross-point buffer being associated with an output port; and
a switch scheduler to perform module-to-module matching, input arbitration, and output arbitration, wherein:
module-to-module matching includes a match of one of the plurality of input modules with one of the plurality of output modules via a selected one of the plurality of central modules,
input arbitration includes selection of a first packet from a first virtual output queue associated with the one of the plurality of input modules, the first packet having a longest occupancy in the first virtual output queue associated with the one of the plurality of input modules and being destined for the one of the plurality of output modules, the selected first packet to be forwarded to the one of the plurality of output modules, and output arbitration includes selection of a second packet from a first cross-point buffer associated with the one of the plurality of output modules, the selected second packet to be forwarded to the output port, of the one of the plurality of output modules, associated with the first cross-point buffer.

12. The system of claim 11, wherein the plurality of first stage buffer-less switches and the plurality of second stage buffer-less switches are substantially a same type of buffer-less switches.

13. The system of claim 11, further comprising:
a plurality of input arbiters, each of the plurality of input arbiters being coupled to a corresponding one of the plurality of input modules and configured to communicate with a corresponding one of the plurality of virtual output queues to facilitate packet transmission from the corresponding one of the plurality of virtual output queues to a cross-point buffer of a corresponding one of the plurality of output modules; and
a plurality of output arbiters, each of the plurality of output arbiters being coupled to the corresponding one of the plurality of output modules and configured to communicate with a corresponding one of the plurality of cross-point buffers to facilitate packet transmission from the corresponding one of the plurality of the cross-point buffers of the matched output module to an output port associated with the corresponding one of the plurality of cross-point buffers.

14. The system of claim 12, wherein the three-stage switch is configured to partition packets into a plurality of fixed-size cells.

15. A method to facilitate packet transmission using a plurality of virtual output queues linked, via a plurality of input ports, to a three-stage switch configured as a Clos-network configuration, wherein the three-stage switch configured as a Clos-network configuration includes a first stage including a plurality of buffer-less input modules, a second stage including a plurality of buffer-less central modules, and a third stage having including a plurality of output modules that include a plurality of cross-point buffers and a plurality of output ports, wherein each cross-point buffer is associated with an output port, the method comprising:
performing module-to-module matching, including matching one of the plurality of input modules with one of the plurality of output modules to provide a matched input module and a matched output module;
performing input arbitration, including selecting a packet to transmit based, at least in part, on the selected packet having a longest occupancy in one of the plurality of virtual output queues associated with the matched input module and being destined for the matched output module;
transmitting the selected packet from the matched input module to a selected one of the plurality of cross-point buffers of the matched output module; and
performing output arbitration, including outputting the packet based, at least in part, on a selection criteria.

16. The method of claim 15, wherein the selection criteria is based, at least in part, on a length of time that the packet has been stored in the selected one of the plurality of cross-point buffers.

17. The method of claim 15, wherein the packet is transmitted from the matched input module to the matched output module via a selected central module.

* * * * *

UNITED STATES PATENT AND TRADEMARK OFFICE
CERTIFICATE OF CORRECTION

PATENT NO. : 8,995,456 B2
APPLICATION NO. : 12/420714
DATED : March 31, 2015
INVENTOR(S) : Rojas-Cessa et al.

It is certified that error appears in the above-identified patent and that said Letters Patent is hereby corrected as shown below:

In the Specification

In Column 1, Lines 7-8, delete "This work was supported in part by National Science Foundation grant number 0435250." and insert -- This invention was made with government support under grant CNS0435250 awarded by the National Science Foundation. The government has certain rights in the invention. --, therefor.

Signed and Sealed this
Eighth Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,995,456 B2
APPLICATION NO. : 12/420714
DATED : March 31, 2015
INVENTOR(S) : Rojas-Cessa et al.

It is certified that error appears in the above-identified patent and that said Letters Patent is hereby corrected as shown below:

Title page, in the illustrative Figure, below processor 610, delete "UP/UC / DSP" and insert -- μP/μC / DSP --, therefor.

Title page, in the illustrative Figure, for Tag "(615)", in Line 1, delete "CONTROLER" and insert -- CONTROLLER --, therefor.

Drawings

In Fig. 6, Sheet 6 of 6, below processor 610, delete "UP/UC / DSP" and insert -- μP/μC / DSP --, therefor.

In Fig. 6, Sheet 6 of 6, for Tag "(615)", in Line 1, delete "CONTROLER" and insert -- CONTROLLER --, therefor.

Specification

In Column 1, Line 36, delete "DRAWING" and insert -- DRAWINGS --, therefor.

In Column 3, Line 7, delete "hierarchizes" and insert -- hierarchies --, therefor.

In Column 6, Line 25, delete "ports" and insert -- ports. --, therefor.

In Column 7, Line 4, delete "module" and insert -- module. --, therefor.

Claims

In Column 10, Line 56, in Claim 2, delete "to the" and insert -- to a --, therefor.

Signed and Sealed this
Twentieth Day of October, 2015

Michelle K. Lee
*Director of the United States Patent and Trademark Office*

CERTIFICATE OF CORRECTION (continued)
U.S. Pat. No. 8,995,456 B2

Claims

In Column 11, Lines 16-17, in Claim 3, delete "corresponding output" and insert -- output --, therefor.

In Column 11, Line 42, in Claim 6, delete "plurality output" and insert -- plurality of output --, therefor.

In Column 14, Line 40, in Claim 15, delete "having including" and insert -- including --, therefor.